(12) United States Patent
Cottron et al.

(10) Patent No.: US 12,380,807 B2
(45) Date of Patent: Aug. 5, 2025

(54) METHOD FOR ASSISTING THE LANDING OF AN AIRCRAFT ON A LANDING RUNWAY

(71) Applicant: THALES, Courbevoie (FR)

(72) Inventors: Rodolphe Cottron, Mérignac (FR); Jean-Philippe Lebrat, Mérignac (FR); Yoan Veyrac, Mérignac (FR)

(73) Assignee: THALES, Courbevoie (FR)

( * ) Notice: Subject to any disclaimer, the term of this patent is extended or adjusted under 35 U.S.C. 154(b) by 621 days.

(21) Appl. No.: 17/774,781

(22) PCT Filed: Nov. 19, 2020

(86) PCT No.: PCT/EP2020/082736
§ 371 (c)(1),
(2) Date: May 5, 2022

(87) PCT Pub. No.: WO2021/099493
PCT Pub. Date: May 27, 2021

(65) Prior Publication Data
US 2022/0406202 A1    Dec. 22, 2022

(30) Foreign Application Priority Data
Nov. 20, 2019   (FR) ...................... 19 12940

(51) Int. Cl.
*G08G 5/54*       (2025.01)
*B64D 45/08*      (2006.01)
(Continued)

(52) U.S. Cl.
CPC ............... *G08G 5/54* (2025.01); *B64D 45/08* (2013.01); *G01S 13/89* (2013.01); *G01S 13/933* (2020.01); *G08G 5/21* (2025.01)

(58) Field of Classification Search
CPC .... G08G 5/025; G08G 5/0021; G01S 13/933; G01S 13/89; B64D 45/08
(Continued)

(56) References Cited

U.S. PATENT DOCUMENTS 3,243,816 A  *  3/1966  Chisholm ................ H01Q 3/44
                                                  342/410
3,775,766 A  *  11/1973 Gendreu ................ G01S 13/913
                                                  342/149
(Continued)

FOREIGN PATENT DOCUMENTS

DE         1506017 A1    12/1969
DE        19513440 A1    10/1996

OTHER PUBLICATIONS

International Search Report and Written Opinion, issued by International Searching Authority in corresponding International Application No. PCT/EP2020/082736, mailed on Feb. 15, 2021.

*Primary Examiner* — Nuzhat Pervin
(74) *Attorney, Agent, or Firm* — ArentFox Schiff LLP

(57) ABSTRACT

The present invention relates to a method for assisting the landing of an aircraft on a landing runway, the method comprising:
  detecting, by a radar, characteristic elements of the landing runway,
  determining the angular offset between the axis of the radar and the runway axis as a function of the coordinates of the characteristic elements detected, and
  determining, as a function of the angular offset determined and the coordinates of the characteristic elements detected:
    the distance of the orthogonal projection onto the runway axis from the horizontal projection of the radar, and
    (Continued)

Figure 1:
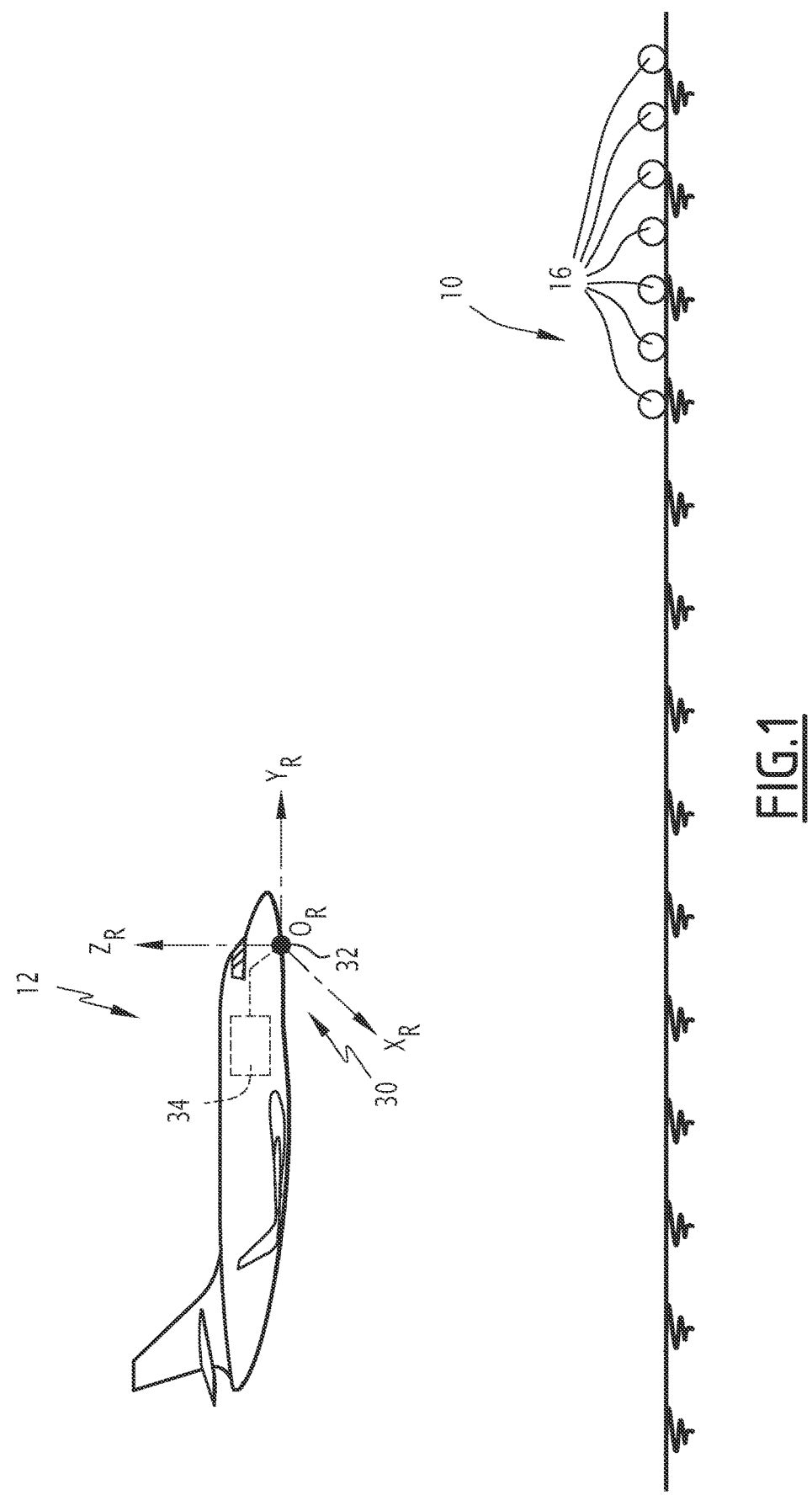

the distance of the orthogonal projection onto the straight line passing through the runway threshold from the horizontal projection of the radar.

8 Claims, 6 Drawing Sheets

(51) Int. Cl.
  *G01S 13/89*    (2006.01)
  *G01S 13/933*   (2020.01)
  *G08G 5/21*    (2025.01)

(58) Field of Classification Search
  USPC .......................................................... 342/33
  See application file for complete search history.

(56) References Cited

U.S. PATENT DOCUMENTS

| | | | | |
|---|---|---|---|---|
| 8,290,644 B2* | 10/2012 | Bouquet | ................ | G01S 19/15 701/16 |
| 11,126,201 B2* | 9/2021 | Rozenberg | ............. | G05D 1/042 |
| 11,262,211 B2* | 3/2022 | Youssef | ................ | G01C 23/005 |
| 12,174,290 B2* | 12/2024 | Kurniawan | ................ | G06T 7/75 |
| 2008/0306639 A1* | 12/2008 | Fleury | ...................... | G08G 5/74 701/8 |
| 2009/0150009 A1* | 6/2009 | Villaume | ................. | G08G 5/51 701/3 |
| 2009/0150010 A1* | 6/2009 | Villaume | ................. | G08G 5/51 701/3 |
| 2012/0265377 A1* | 10/2012 | Boulay | ..................... | G01S 1/56 701/17 |
| 2013/0066489 A1* | 3/2013 | Hooks | ....................... | G01S 1/16 701/17 |
| 2013/0191016 A1* | 7/2013 | Baillon | ..................... | G08G 5/54 701/301 |
| 2013/0245862 A1* | 9/2013 | Putz | ........................ | G08G 5/54 701/18 |
| 2015/0066240 A1* | 3/2015 | Das Adhikary | .......... | G08G 5/53 701/1 |
| 2018/0024237 A1* | 1/2018 | Laplace | ............... | G06V 20/588 701/16 |
| 2020/0378791 A1* | 12/2020 | Hausmann | ................ | G06T 7/73 |
| 2021/0293930 A1* | 9/2021 | Wu | ......................... | G06F 18/23 |
| 2021/0311167 A1* | 10/2021 | Peng | ........................ | G06V 10/806 |
| 2021/0407306 A1* | 12/2021 | Nielsen | ................. | H01Q 15/18 |

* cited by examiner

METHOD FOR ASSISTING THE LANDING OF AN AIRCRAFT ON A LANDING RUNWAY

CROSS-REFERENCE TO RELATED APPLICATIONS

This application is a National Stage Entry of International Patent Application No. PCT/EP2020/082736, filed on Nov. 19, 2020, which claims priority to French Application No. 1912940, filed on Nov. 20, 2019. The disclosures of the priority applications are incorporated in their entirety herein by reference.

The present invention relates to a method for assisting the landing of an aircraft on a landing runway. The present invention also relates to an associated device for assisting the landing.

Equipping aircraft with devices for assisting landing is known in the field of aeronautics. The purpose of such devices is to determine the position of the aircraft in relation to the landing runway.

A known device for assisting landing comprises a radar that makes it possible to acquire images of the landing runway. To determine the relative position of the aircraft in relation to the landing runway, a calculator compares the acquired images to reference images from an image database. The database comprises images of landing runways from a set of airports. The comparison makes it possible to identify the landing runway, which then makes it possible to calculate the relative position of the aircraft in relation to the landing runway, depending on characteristic elements of the image.

Nevertheless, such an assistance device only makes reliable assistance possible if the landing runway is referenced in the image database. Moreover, such a device is cumbersome to install in the aircraft, in particular because of its database, which occupies a significant memory volume.

There is therefore a need for a device for assisting in landing that provides reliable assistance regardless of the landing airport while being less resource consuming.

To this end, the invention has as its object a method for assisting in landing an aircraft on a landing runway, the landing runway having a longitudinal axis equidistant from the longitudinal edges of the landing runway, called the runway axis, the landing runway comprising a set of characteristic elements, the characteristic elements being distributed over the landing runway in at least two longitudinal rows and at least one transverse row, the longitudinal rows being substantially parallel to the runway axis, two of the longitudinal rows each being arranged along a distinct longitudinal edge of the landing runway, the or each transverse row being substantially perpendicular to the runway axis, the last transverse row in the direction for landing the aircraft on the landing runway being called the runway threshold, the method being implemented by a landing assistance device comprising a radar and a calculator, the radar having a longitudinal detection axis, called the radar axis, the method comprising:
- detecting, by the radar, of characteristic elements of the landing runway, each detection being associated to coordinates,
- determining the angular offset between the axis of the radar and the runway axis as a function of the coordinates of the characteristic elements detected, and
- determining, as a function of the angular offset determined and the coordinates of the characteristic elements detected, the:
  - the distance of the orthogonal projection onto the runway axis from the horizontal projection of the radar, called the axial offset, the horizontal projection of the radar being the orthogonal projection of the radar position in the horizontal plane of the landing runway, and
  - the distance of the orthogonal projection onto the straight line passing through the runway threshold from the horizontal projection of the radar, called the runway threshold distance.

According to other advantageous aspects of the invention, the landing assistance method comprises one or more of the following features, taken alone or in any technically possible combination:
- the step of determining the angular offset comprises:
  - converting the coordinates of each detection into Cartesian coordinates,
  - for each angular offset value comprised in an interval of predetermined values, determining a Cartesian coordinate along the x-axis (axis of abscissa), for each detection, corrected by the value of said angular offset,
  - for each angular offset value comprised in the interval of predetermined values, determining the number of detections corresponding to each corrected Cartesian coordinate along the x-axis, the angular offset value associated with the greatest number of detections being the angular offset between the radar axis and the runway axis.
- the distance determination step comprises:
  - calculating the Cartesian coordinates of each detection, corrected for the angular offset determined in the determination step, known as optimal Cartesian coordinates,
  - determining a histogram of the positions along the x-axis of each detection as a function of the optimal Cartesian coordinates of each detection, the histogram having at least two peaks, and
  - determining the axial offset as a function of the Cartesian coordinates along the x-axis of the at least two peaks of the histogram.
- the step of determining distances comprises:
  - calculating the Cartesian coordinates of each detection, corrected for the angular offset determined in the determination step, known as the optimal Cartesian coordinates,
  - determining a histogram of the positions along the y-axis of each detection as a function of the optimal Cartesian coordinates of each detection, the histogram having at least one peak, and
  - determining the distance to the runway threshold as a function of the Cartesian coordinates along the y-axis of the peak(s) of the histogram.
- the method comprises a step of determining the value of at least one trajectory size as a function of the axial offset determined and the distance to the runway threshold determined, the or each trajectory size being chosen from an angular lateral deviation of the aircraft, an angular vertical deviation of the aircraft, a metric lateral deviation of the aircraft and a metric vertical deviation of the aircraft.
- the method comprises a first step of determining the horizontal speed of the aircraft in relation to the runway axis expressed according to two components as a function of the variation over time of the distance to the runway threshold and of the variation over time of the axial offset.

the method comprises a second step of determining the horizontal speed of the aircraft in relation to the runway axis expressed according to two components as a function of the values over time of the determined angular offset and of the Cartesian coordinates of the detections corrected for said angular offset.

the second step of determining the horizontal speed of the aircraft comprises:

determining a first point cloud showing the real positions of the detections at a first instant, corrected by the value of the determined angular offset, determining a second points cloud, representing the real positions of the detections at a second instant, corrected of the value by the determined angular offset, the second instant being after the first instant, determining third points clouds, for test values of the horizontal speed components of the aircraft, representing the theoretical positions of the detections at the second instant as a function of the first points cloud, and calculating the distance between the first point cloud and each third point cloud, the horizontal speed components being obtained as a function of the minimum distance calculated and the time difference between the first instant and the second instant.

The invention further relates to a device for assisting the landing of an aircraft on a landing runway, the landing runway having a longitudinal axis equidistant from the longitudinal edges of the landing runway, called the runway axis, the landing runway comprising a set of characteristic elements, the characteristic elements being distributed over the landing runway in at least two longitudinal rows and at least one transverse row, the longitudinal rows being substantially parallel to the runway axis, two of the longitudinal rows each being arranged along a distinct longitudinal edge of the landing runway, the or each transverse row being substantially perpendicular to the runway axis, the last transverse row in the direction of landing the aircraft on the landing runway being called the runway threshold, the landing assistance device comprising a radar and a calculator, the radar having a longitudinal detection axis, called the radar axis, the landing assistance device being configured to implement a landing assistance method as previously described.

The invention also relates to an aircraft comprising a landing assistance device as previously described.

Figure 2:
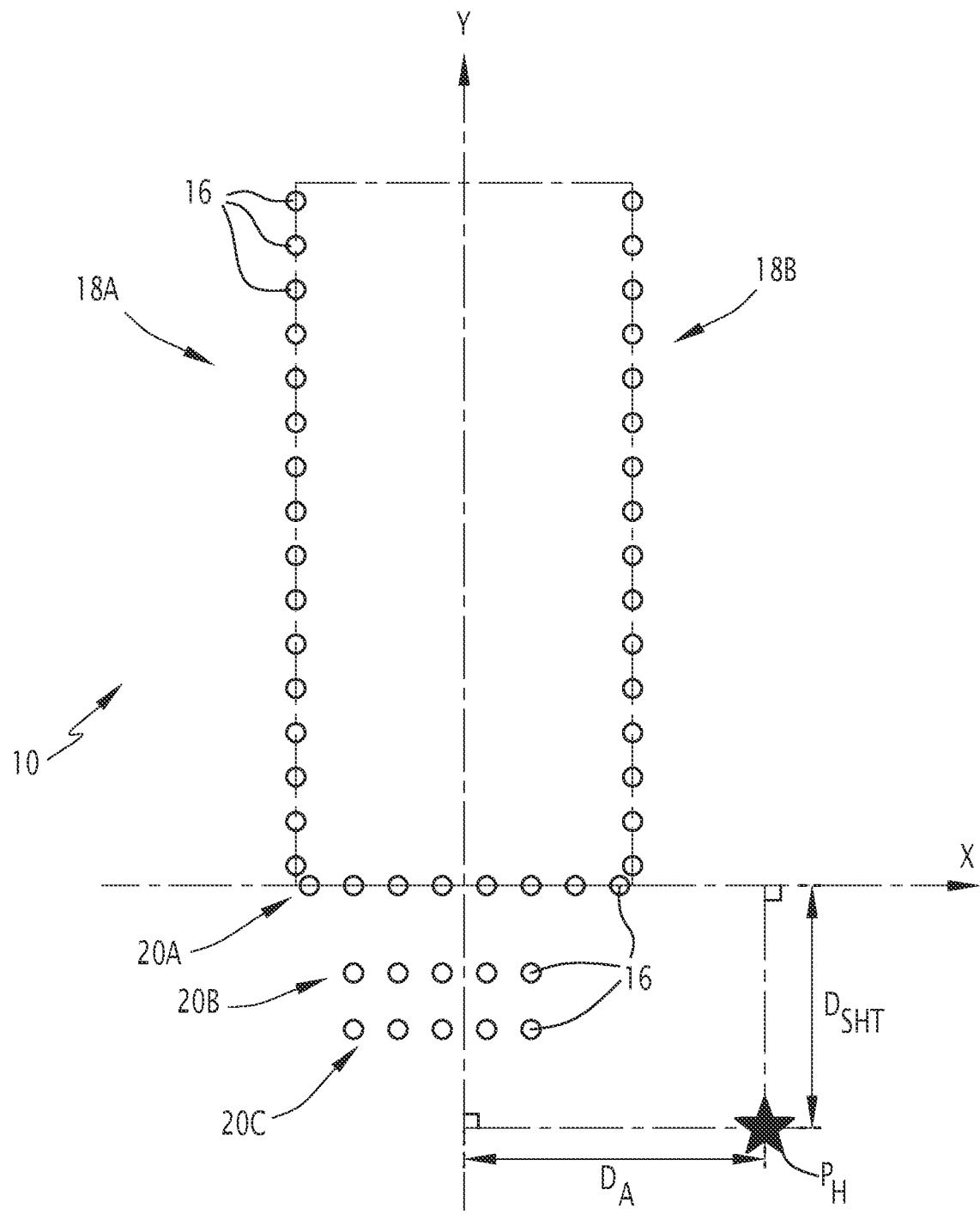
Figure 3:
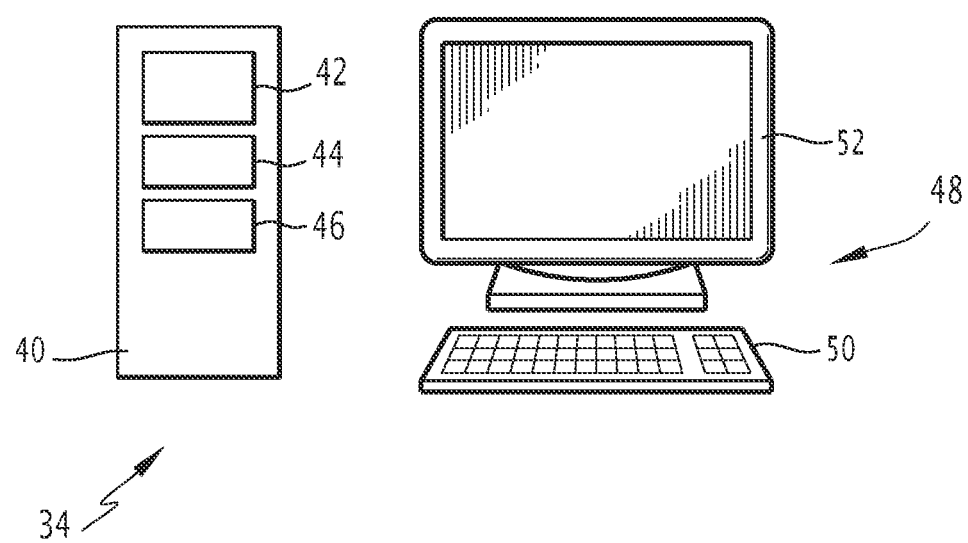
Figure 4:
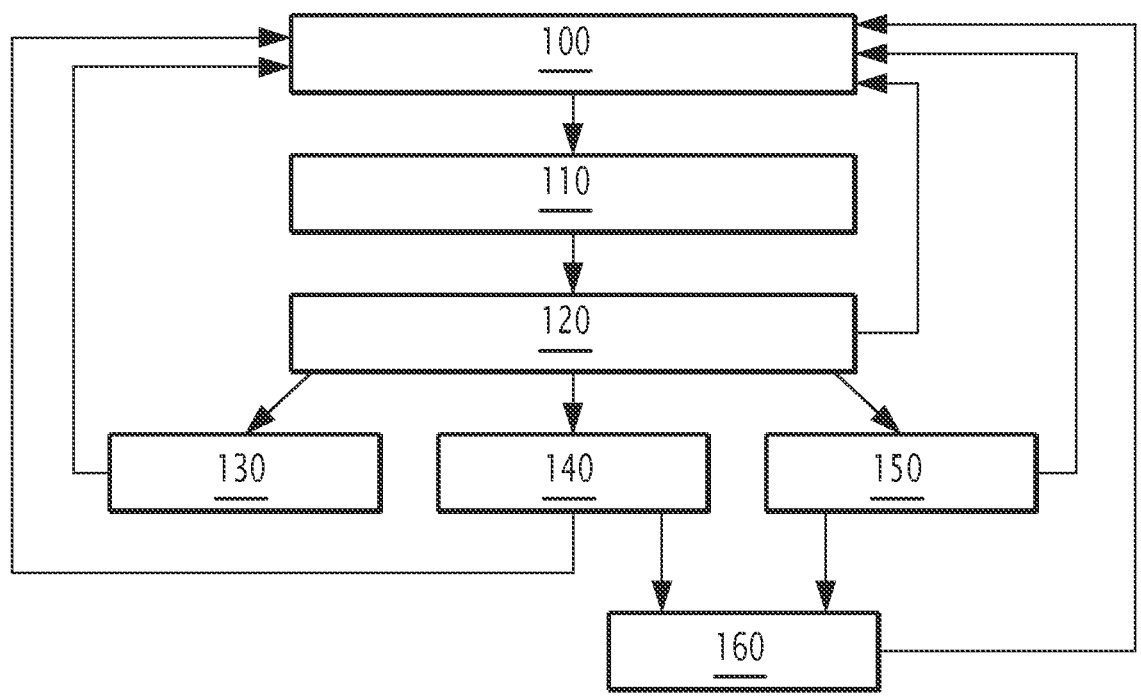
Figure 5:
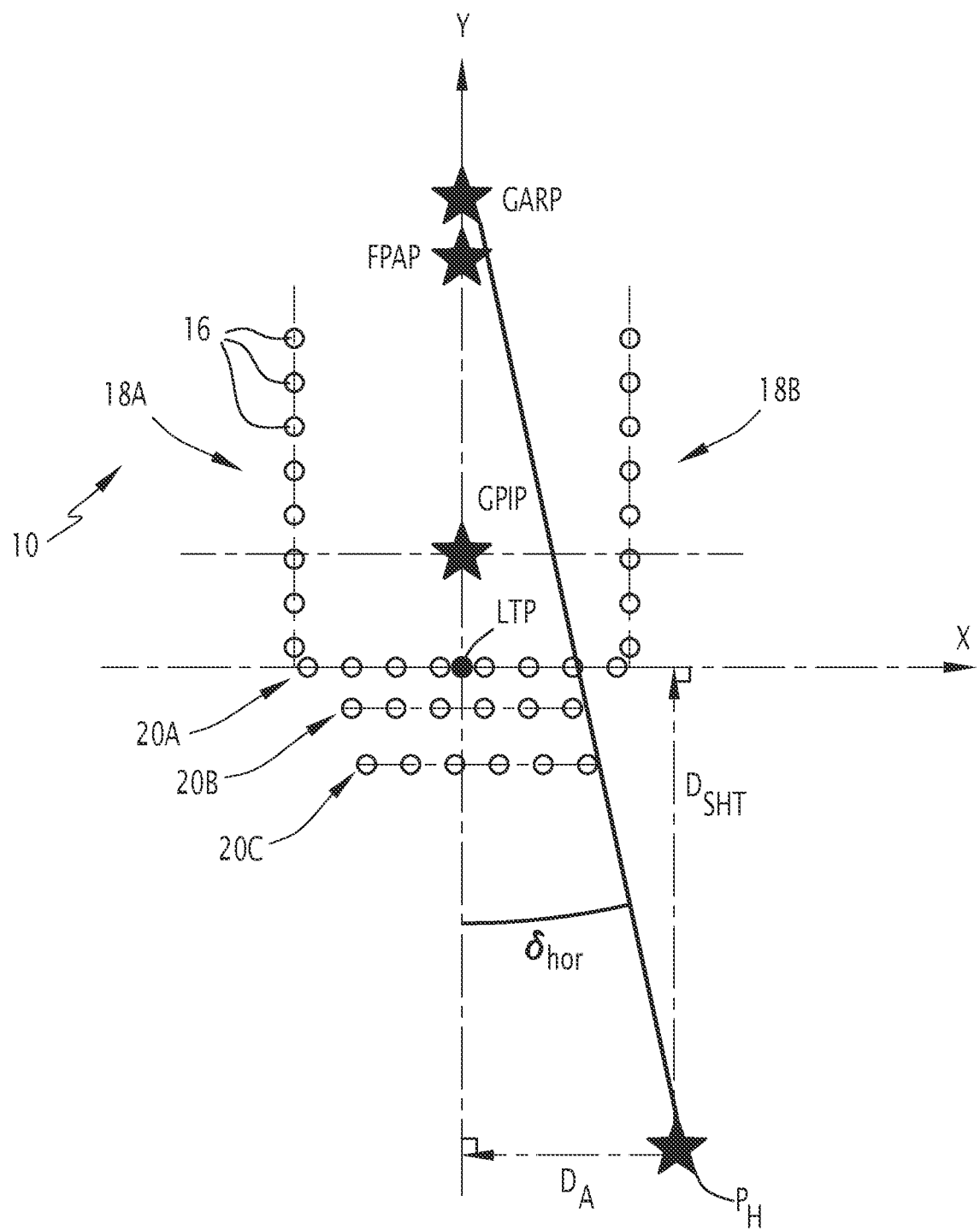
Figure 6:
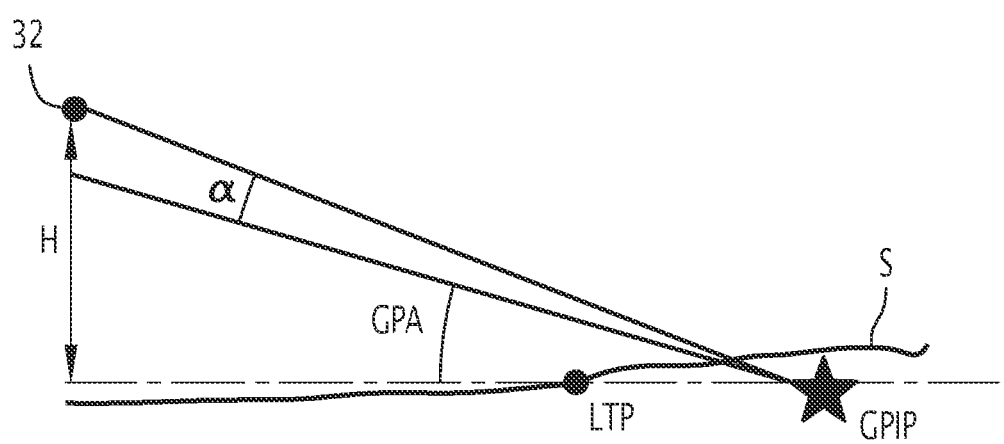

Further features and advantages of the invention will become apparent from the following description of embodiments of the invention, given by way of example only, and with reference to the drawings, which are:

FIG. 1, a schematic representation of an aircraft approaching a landing runway,

FIG. 2, a schematic representation viewed from above of an example of a landing runway and the horizontal projection of an aircraft radar in the horizontal plane of the landing runway, FIG. 3, a schematic representation of an example of the calculator of a landing assistance device, FIG. 4, a flow chart of an example of a landing assistance method, FIG. 5, a schematic representation viewed from above of the landing runway of FIG. 2, with added reference points and angles, and FIG. 6, a schematic side view of the landing runway of FIG. 2 with added reference points and angles.

A landing runway 10 and an aircraft 12 in flight are illustrated in FIG. 1. As seen in this FIG. 1, the aircraft 12 is approaching the landing runway 10 for a landing on the runway 10.

The landing runway 10 is a rectangular surface intended for aircraft landing and takeoff. The landing runway 10 comprises longitudinal edges (two) and transverse ends (two) delineating the landing runway 10.

The length of the landing runway 10 is between 3 kilometers (km) and 4 km, for example. The width of the landing runway 10 is between 25 m and 45 m, for example.

As visible in FIG. 2, the landing runway 10 has a longitudinal axis in the longitudinal direction of the landing runway 10 and equidistant from the longitudinal edges of the landing runway 10. This longitudinal axis is called the runway axis Y. An axis perpendicular to the runway axis Y is also shown by the reference "X" in FIG. 2.

The landing runway 10 comprises a set of characteristic elements 16. For the sake of clarity, only certain characteristic elements 16 are numbered in FIG. 2. The characteristic elements 16 are lamps, for example, also called light beacons. In a variant, the characteristic elements 16 are radar reflectors (trihedral type or Luneberg lenses). In a variant, the characteristic elements 16 are other elements that exist on a landing runway.

The characteristic elements 16 are distributed on the landing runway 10 in at least two longitudinal rows 18A, 18B and at least one transverse row 20.

The longitudinal rows 18A, 18B are substantially parallel to the runway axis Y. Two of the longitudinal rows 18A, 18B are each arranged along a separate longitudinal edge of the runway 10. By the term "arranged along", the rows are understood to be arranged within three meters of the corresponding longitudinal edge.

The or each transverse row 20 is substantially perpendicular to the runway axis Y.

In the example shown in FIG. 1, the landing runway 10 comprises three transverse rows 20A, 20B, 20C of characteristic elements 16. The last transverse row 20A in the direction of an aircraft landing on landing runway 10 is called the runway threshold (row 20A in the example in FIG. 2).

In a variant, the landing runway 10 comprises at least three longitudinal rows: the two longitudinal rows 18A, 18B and a third longitudinal row 18C (not shown) arranged along the runway axis Y and below the runway threshold.

The aircraft 12 is an airplane or a helicopter, for example.

As visible in FIG. 1, the aircraft 12 comprises a landing assistance device 30. The device 30 comprises at least one radar 32 and a calculator 34.

The radar 32 defines a reference frame shown in FIG. 1 as a Cartesian coordinate system with center $O_R$, abscissa $X_R$, ordinate $Y_R$, and elevation $Z_R$. The y-axis $Y_R$ is the longitudinal detection axis and is called the radar axis. When the radar 32 is properly positioned on the aircraft 12, the radar axis $Y_R$ coincides with the longitudinal axis of the aircraft 12.

Advantageously, the radar 32 is a millimeter wave radar. Preferably, the range resolution of the radar is of the order of a few meters, and the angular resolution of the radar is fine, that is, of the order of a few tenths of degrees.

Preferably, the radar 32 comprises at least three receiver channels for measuring the radial detection range, the circular angle in the radar frame 32 of the detection, and the elevation angle in the radar frame 32 of the detection, for each detection. The radial distance of any point M is its distance from the origin $O_R$ of the frame. The circular angle, or circularity, is the angle of the projection on the $(O_R X_R Y_R)$ plane of the angle carried by the $(O_R Y_R)$ axis and the straight line $(O_R C)$ passing through the target point C. The elevation angle is the angle formed between the plane $(O_R X_R Y_R)$ of the radar 32 and the line going from the radar 32 to the target point C.

The calculator 34 is a computer, for example.

In the example shown in FIG. 3, the calculator 34 comprises a processor 40 comprising a data processing unit 42, memories 44, an information medium reader 46, and optionally a human-machine interface 48 comprising a keyboard 50 and a display 52.

The processing unit 42 interacts with a computer program product. The computer program product comprises an information medium. The information medium is a medium readable by the processing unit 42. The readable information medium is a medium adapted to store electronic instructions and capable of being coupled to a bus of a computer system.

For example, the information medium is a USB key, floppy disk, optical disk, CD-ROM, magneto-optical disk, ROM, RAM, EPROM, EEPROM, magnetic card or optical card.

The computer program comprising program instructions is stored on the information medium.

The computer program is loadable onto the data processing unit 42 and is adapted to trigger the implementation of the steps of a landing assistance method as will be described in the rest of the description.

In another example, the calculator 34 is implemented as one or more programmable logic components, such as a Field Programmable Gate Array (FPGA), or as one or more dedicated integrated circuits, such as an Application Specific Integrated Circuit (ASIC). In this case, the calculator 34 is configured to implement the steps of a landing assistance method as will be described in the rest of the description.

In a variant or additionally, the calculator 34 is installed in the radar 32.

The operation of the landing assistance device 30 will now be described with reference to FIG. 4, which schematically illustrates an example embodiment of a landing assistance method.

The landing assistance method is implemented during an approach of the aircraft 12 to the landing runway 10 for landing.

Advantageously, the landing assistance method is implemented in real time, that is, at each instant.

The landing assistance method comprises a step 100 of the radar 32 detecting characteristic elements 16 of the landing runway 10. Each detection is associated with coordinates. In particular, each detection is defined by a radial distance, a circular angle in the radar frame 32 and an elevation angle in the radar frame 32. At the end of the detection step, a radar image is thus obtained, on which the detections are shown.

In the same manner, after changing the reference frame, each detection can be defined by a radial distance D, an elevation angle S, defined in relation to the horizontal reference frame local to the aircraft 12 and a bearing angle G, defined in relation to the longitudinal axis of the aircraft 12.

For example, to go from the coordinates (elevation, circular)=(E,C) to (elevation, bearing)=(S,G), we start by calculating the director vector in Cartesian, ux=cos E·cos C, uy=cos E·sin C and uz=sin E. To this vector we then apply the rotation matrix corresponding to the opposite of the radar elevation angle, then the rotation matrix corresponding to the opposite of the aircraft roll, then the rotation matrix corresponding to the opposite of the aircraft pitch. The vector obtained is in Cartesian coordinates in the horizontal, local to the aircraft and the values of the site and bearing are obtained by performing the transformation from Cartesian to polar.

Such an operation implies knowing the elevation setting angle of the radar (linked to the mechanical installation of the radar on the aircraft), the roll and pitch of the aircraft, generally provided by the aircraft's inertial unit.

Advantageously, the radar 32 applies a constant false alarm rate (CFAR) type of processing to the radar image obtained, which makes a better detection of the characteristic elements 16 possible. Thus, temporally, we begin by forming a "radar image" from the signals backscattered by the ground and received by the radar. To this image, a CFAR processing is applied, which makes it possible to provide a list of detections with their coordinates.

The landing assistance method comprises a step 110 of determining the angular offset T between the radar axis $Y_R$ and the runway axis Y as a function of the coordinates of the characteristic elements 16 detected. The determination step 110 is implemented by the calculator 34.

In a first example, that fact that the characteristic elements 16 are aligned in rows parallel to the runway Y is exploited.

In this first example, the determination step 110 comprises converting the coordinates of the detected characteristic elements into Cartesian coordinates. The Cartesian coordinates are given by the following formulas:

$$x = D \cdot \cos S \cdot \sin G \quad (1)$$

$$y = D \cdot \cos S \cdot \cos G \quad (2)$$

Where:
x denotes a Cartesian coordinate along the x-axis,
y denotes a Cartesian coordinate along the y-axis,
D denotes the radial distance,
S denotes the elevation angle, and
G denotes the bearing angle.

Next, the determination step 110 comprises, for the angular offset test values $T_{test}$, determining a Cartesian coordinate along the x-axis, corrected by the value of said angular offset $T_{test}$, for each detection. The angular offset test values $T_{test}$ are the values comprised in a predetermined interval of values with a predetermined step. The range of values is between −10° (degrees) and 10°, for example, and the predetermined step equal to one tenth of a degree. Thus, for each angular offset test value $T_{test}$, the Cartesian coordinates along the x-axis of the detections are obtained by the following formula:

$$x = D \cdot \cos S \cdot \sin(G + T_{test}) \quad (3)$$

Then, for each angular offset test value $T_{test}$, the determination step 110 comprises determining the number of detections corresponding to each corrected Cartesian coordinate along the x-axis. The angular offset value $T_{test}$ associated with the greatest number of detections is the angular offset T between the radar axis $Y_R$ and the runway axis Y. This amounts to making a histogram of the positions along the x-axis, for each angular offset test value $T_{test}$, and counting the number of detections whose position in x gives the highest peak (whatever the value of x), for each interval along the x-axis, which reflects the fact that the detections have been aligned as well as possible in relation to the runway axis Y.

Optionally, the angular offset T is refined by finding the position of the second-order regression maximum around this peak.

In a second example, the angular offset T is obtained by performing a principal component analysis (PCA) of the list of detections. In this case, the covariance matrix of the (x,y) pairs is first computed, which makes it possible to deduce the eigenvectors and finally the angular offset T.

In a third example, the angular offset T is obtained by applying a Hough transform to the list of detections, and the accumulation point gives the angular offset T.

However, the second and third examples give less robust results than the first example, because each characteristic element does not always correspond to a detection (detection probability <1), or some detections may not be characteristic elements 16 (other objects near the runway that may lead to a detection, or a false alarm).

At the end of the determination step 110, the Cartesian coordinates of the detections corrected for the angular offset T, called optimal Cartesian coordinates, are given by the following formulas:

$$x = D \cdot \cos S \cdot \sin(G+T) \quad (4)$$

$$y = D \cdot \cos S \cdot \cos(G+T) \quad (5)$$

The landing assistance method comprises a step 120 of determining the relative position of the aircraft 12 in relation to the landing runway 10 as a function of the angular offset T determined and the coordinates of the characteristic elements 16 detected. The determination step 120 is implemented by the calculator 34.

For this, a first distance, called the axial offset $D_A$ and a second distance, called the distance to the runway threshold $D_{SHT}$ are determined. The axial offset $D_A$ is the distance of the orthogonal projection on the runway axis Y of the horizontal projection $P_H$ of the radar 32. The horizontal projection $P_H$ of the radar 32 is the orthogonal projection of the position of radar 32 in the horizontal plane of the landing runway 10. The distance to the runway threshold $D_{SHT}$ is the distance of the orthogonal projection on the line through the runway threshold of the horizontal projection $P_H$ of the radar 32.

For example, the axial offset $D_A$ is obtained by determining a histogram of the positions along the x-axis of each detection based on the optimal Cartesian coordinates of each detection. The histogram obtained has as many peaks as there are longitudinal rows of the characteristic elements 16 on the landing runway 10. Consequently, the histogram comprises at least two lateral peaks corresponding to the two longitudinal rows 18A, 18B extending along the longitudinal edges of the landing runway 10. The axial offset $D_A$ corresponds to the average of the x-axis coordinates of the two lateral peaks, for example.

In a variant, when the landing runway 10 additionally has a longitudinal row of characteristic elements 16 extending along the runway axis Y, the resulting histogram also has a central peak between the two lateral peaks. In this case, the axial offset $D_A$ is the x-position of the central peak, for example.

For example, the distance to the runway threshold $D_{SHT}$ is obtained by determining a histogram of the positions along the y-axis of each detection as a function of the optimal Cartesian coordinates of each detection. The resulting histogram has as many peaks as there are transverse rows of characteristic elements 16 on the runway 10. The distance to the runway threshold $D_{SHT}$ in this case is the y-axis coordinate of the farthest peak, that is, the peak with the largest y-coordinate.

Optionally, the landing assistance method comprises a step 130 of determining the value of at least one trajectory value as a function of the axial offset $D_A$ determined and the distance to the runway threshold $D_{SHT}$ determined. The determination step 130 is implemented by the calculator 34.

The trajectory deviations (metric and angular) are defined by the DO-253C standard relating to the "Final Approach Segment" tool (abbreviated as FAS) defined by the DO-229E standard, for example.

In particular, the trajectory deviations are defined in relation to the reference angles and distances illustrated by FIGS. 5 and 6, which are:

the LTP (landing threshold point) is the point on the ground S located at the intersection of the runway axis Y and the runway threshold.

The FPAP (flight path alignment point) is a point located in relation to the LTP. They are aligned along the runway axis Y, and the difference between these two points is given in latitude and longitude.

The GARP point is a point located on the runway axis Y and positioned 305 meters beyond the FPAP.

The GPIP (glide slope interception point) is located 290 m from the LTP along the runway axis Y.

The GPA (Glide Path Angle) represents the ideal trajectory angle in relation to the local horizontal at the LTP. It is usually 3°.

The "Final Approach Segment" tool makes it possible to calculate the position of the GPIP, FPAP and GARP points.

The or each trajectory value is selected from: an angular lateral deviation $\delta_{hor}$ of the aircraft 12, an angular vertical deviation $\alpha$ of the aircraft 12, a metric lateral deviation of the aircraft 12, and a metric vertical deviation of the aircraft 12. An angular lateral deviation is a deviation relative to the earth's vertical plane passing through the runway axis Y. An angular vertical deflection is a deflection relative to a cone whose vertex is the GPIP, whose axis of revolution is the earth's vertical plane at the GPIP and whose angle relative to the earth's horizontal plane at the GPIP is an angle called the GPA (Glide Path Angle). The metric lateral deviation is equal to the axial offset $D_A$.

To determine the path deviations, the height of the aircraft in relation to the horizontal plane of the earth at the GPIP (shown in FIG. 6) is named H. The height H of the aircraft is information external to the radar 32 or, preferably, determined by the radar 32.

In the previous step 120 of determining distances, the distance to the runway threshold $D_{SHT}$ was determined, which is a distance in the earth's horizontal plane at the GPIP, and the axial offset $D_A$, which is a distance in the earth's horizontal plane at the GPIP. The distance to the runway threshold $D_{SHT}$ is linked to the height H of the aircraft 12 by the following formula:

$$D_s^2 = H^2 + D_{SHT}^2 \quad (6)$$

Where DS is the oblique distance of the radar 32 in relation to the runway axis Y.

The lateral deviations are then calculated by the following formulas:

$$\text{Metric Lateral Deviation} = D_A \quad (7)$$

$$\text{Angular Lateral Deviation} = \quad (8)$$

$$\delta_{hor} = \left( \frac{D_A}{D_{SHT} + \|\overrightarrow{LTP\ GPIP}\| + \|\overrightarrow{GPIP\ FPAP}\| + \|\overrightarrow{FPAP\ GARP}\|} \right)$$

-continued $$\text{Angular Vertical Deviation} = \alpha = atan\left(\frac{H}{D_{SHT} + \|\overrightarrow{LTP\ GPIP}\|}\right) - GPA \quad (9)$$

$$\text{Metric Lateral Deviation} = Ds \cdot \sin(\alpha) \quad (10)$$

The lateral deviations have a positive sign when the FAS is starboard of the aircraft and, otherwise, negative. Vertical deviations have a positive sign when the aircraft is above the reference cone and, otherwise, negative.

From these calculated trajectory deviations, it is possible to monitor the actual trajectory of the aircraft 12 in relation to the theoretical trajectory, or even to go as far as automatic guidance of the aircraft for landing.

Optionally, the landing assistance method comprises a first step 140 of determining the horizontal velocity of the aircraft 12 in relation to the runway axis Y, expressed according to two components Vx, Vy as a function of the variation over time of the distance to the runway threshold $D_{SHT}$ and the variation over time of the axial offset $D_A$. The Vx component is the velocity component projected on the x-axis. The Vy component is the velocity component projected on the y-axis. The determination step 140 is implemented by the calculator 34.

In particular, the variation over time of the distance to the runway threshold $D_{SHT}$ gives the velocity component Vy, and the variation over time of the axial offset DA gives the velocity component Vx. Such variations over time are calculated using a Kalman filter, for example.

Optionally, the landing assistance method comprises a second step 150 of determining the horizontal velocity of the aircraft 12 in relation to the runway axis Y expressed according to the two components Vx, Vy as a function of the values over time of the determined angular offset T and of the Cartesian coordinates of the detections corrected for said angular offset T. The determination step 150 is implemented by the calculator 34.

In particular, the second step 150 of determining the horizontal velocity of the aircraft 12 comprises, for example:
  determining a first point cloud P1 representing the actual positions of the detections at a first instant T1, corrected by the value of the determined angular offset T. The first instant T1 is the current instant, for example.
  determining a second point cloud P2 representing the real positions of the detections at a second instant T2, corrected by the value of the determined angular offset T. The second instant T2 is the next instant, for example,
  for test values of the components Vx, Vy of the horizontal speed of the aircraft 12, determining third point clouds P12 representing the theoretical positions P12 of the detections at the second instant T2, as a function of the first point cloud P1. The theoretical position P12 of the third points clouds given by the following formula: P12=P1−V*(T2−T1) with V the horizontal speed of the aircraft 12, P1 the position of the first point cloud and P2 the position of the second point cloud. The test values of the components Vx, Vy are comprised in an interval of predetermined values, for example.
  calculating the distance between the first point cloud P1 and each third point cloud P12. The components Vx, Vy of the horizontal speed corresponding to the minimum distance value are considered as being the components of the horizontal speed of the aircraft 12. The components Vx, Vy are thus obtained as a function of to the minimum distance calculated and the time difference between the current instant T1 and the second instant T2.

For example, the distance calculated between the point clouds is the chamfer distance defined by:

$$d(P2, P12) = \sum_{Q \in P2} \min_{R \in P12} \|Q - R\| + \sum_{R \in P12} \min_{Q \in P2} \|Q - R\| \quad (11)$$

Where:
$\|Q-R\|$ is, for example, the Euclidean norm $\sqrt{(Q_x-P_x)^2+(Q_y-P_y)^2}$ Taking into account clouds of points and clouds not of points alone makes it possible to get rid of noise measurement.

Again, the estimate can be refined by performing a second-order regression around the minimum distance value, and this velocity estimate can be smoothed, by a Kalman filter, for example.

Optionally, the landing assistance method comprises a step 160 of determining a confidence indicator by comparing the components (Vx, Vy) of the horizontal velocity of the aircraft 12 obtained by the first and second determination steps. The determination step 160 is implemented by the calculator 34.

For example, when a difference between the respective horizontal velocity components obtained between the two steps is greater than a predetermined value, the determined confidence index is strictly less than a confidence index threshold value. Otherwise, the confidence index value is higher than the threshold value. A confidence index value greater than the threshold value indicates that the relative position of the aircraft 12 determined in the determination step 110 is reliable, as are the horizontal velocity values obtained. Otherwise, the determined values are likely to be erroneous.

Thus, the described device and method make it possible to determine various parameters assisting in landing the aircraft 12, and this in an autonomous manner, without resorting to a database and without making any assumption on the precise arrangement of the characteristic elements 16 of the landing runway 10. Such a device and method can therefore be used at any airport and on any landing runway 10. In particular, only the characteristic elements 16 already present on the landing runway are used in implementing the method. Thus, no additional ground infrastructure is required.

Such a landing assistance device 30 is thus likely to complement or replace an ILS (Instrument Landing System).

Thus, the method and the device described make reliable assistance possible for landing an aircraft 12, whatever the landing airport, while being less resource consuming.

The person skilled in the art will understand that the above-described embodiments are capable of being combined with each other where such a combination is compatible.

The invention claimed is:

1. A method for assisting a landing of an aircraft on a landing runway, the landing runway having a longitudinal axis equidistant from a longitudinal edges of the landing runway, called a runway axis, the landing runway comprising a set of characteristic elements, the characteristic elements being distributed over the landing runway in at least two longitudinal rows and at least one transverse row, the longitudinal rows being substantially parallel to the runway axis, with two of the longitudinal rows each being arranged along a distinct longitudinal edge of the landing runway, with the or each transverse row being substantially perpendicular to the runway axis, a last transverse row in a direction of landing the aircraft on the landing runway being called a runway threshold, the method being implemented by a landing assistance device comprising a radar and a calculator, the radar having a longitudinal detection axis, called the radar axis, the method comprising:

- detecting, by the radar characteristic elements of the landing runway, each detection being associated to coordinates,
- determining an angular offset between the radar axis and the runway axis as a function of the coordinates of the characteristic elements detected, and
- determining, as a function of the angular offset determined and the coordinates of the characteristic elements detected:
  - a distance of an orthogonal projection onto the runway axis of a horizontal projection of the radar, called an axial offset, the horizontal projection of the radar being the orthogonal projection of a position of the radar in a horizontal plane of the landing runway, and
  - the distance of the orthogonal projection onto a line passing through the runway threshold of the horizontal projection of the radar, called the distance to the runway threshold,
- wherein the method further comprises a step of determining a horizontal velocity of the aircraft in relation to the runway axis expressed in two components as a function of values over time of the determined angular offset and a Cartesian coordinates of the detections corrected for said angular offset,
- wherein the step of determining the horizontal velocity of the aircraft comprises:
  - determining a first point cloud representing an actual positions of the detections at a first instant, corrected by the value of the angular offset determined,
  - determining a second point cloud representing the actual positions of the detections at a second instant, corrected by the value of the angular offset determined, with the second instant being later than the first instant
  - for test values of the components of a horizontal speed of the aircraft, determining third point clouds representing theoretical positions of the detections at the second instant as a function of the first point cloud, and
  - calculating the distance between the first point cloud and each third point cloud, with the components of the horizontal velocity being obtained as a function of a minimum distance calculated and a time difference between the first instant and the second instant.

2. The method according to claim 1, wherein a step of determining the angular offset comprises:
- converting the coordinates of each detection into Cartesian coordinates,
- for each angular offset value comprised in a predetermined value interval, determining a Cartesian coordinate along a x-axis, for each detection, corrected by the value of said angular offset,
- for each angular offset value comprised in the predetermined value interval, determining a number of detections corresponding to each Cartesian coordinate corrected along the x-axis, the angular offset value associated with a greatest number of detections being the angular offset between the radar axis and the runway axis.

3. The method according to claim 1, wherein a distance determination step comprises:
- calculating a Cartesian coordinates of each detection, corrected for the angular offset determined in the determination step, known as optimal Cartesian coordinates,
- determining a histogram of the positions along a x-axis of each detection as a function of the optimal Cartesian coordinates of each detection, the histogram having at least two peaks, and
- determining the axial offset as a function of the Cartesian coordinates along the x-axis of the at least two peaks of the histogram.

4. The method according to claim 1, wherein a distance determination step comprises:
- calculating a Cartesian coordinates of each detection, corrected for the angular offset determined in the determination step, known as optimal Cartesian coordinates,
- determining a histogram of the positions along a y-axis of each detection as a function of the optimal Cartesian coordinates of each detection, the histogram having at least one peak, and
- determining the distance to the runway threshold as a function of the Cartesian coordinates on the y-axis of a one or more peaks in the histogram.

5. The method according to claim 1, wherein the method comprises a step of determining a value of at least one trajectory value as a function of the determined axial offset and the determined distance to the runway threshold,
the at least one trajectory value being selected from: an angular lateral deviation of the aircraft, an angular vertical deviation of the aircraft, a metric lateral deviation of the aircraft and a metric vertical deviation of the aircraft.

6. The method according to claim 1, wherein the method comprises a first step of determining a horizontal velocity of the aircraft in relation to a runway centerline expressed in two components as a function of a variation over time of the distance to the runway threshold and the variation over time of the axial offset.

7. A device for assisting the landing of an aircraft on a landing runway, the landing runway having a longitudinal axis equidistant from the longitudinal edges of the landing runway, called the runway axis, the landing runway comprising a set of characteristic elements the characteristic elements being distributed on the landing runway in at least two longitudinal rows and at least one transverse row, the longitudinal rows being substantially parallel to the runway axis, two of the longitudinal rows each being arranged along a distinct longitudinal edge of the landing runway, the or each transverse row being substantially perpendicular to the runway axis, with the last transverse row in the direction of landing the aircraft on the landing runway being called the runway threshold, the landing assistance device comprising a radar and a calculator, the radar having a longitudinal detection axis, called the radar axis, the landing assistance device being configured to implement a method according to claim 1.

8. An aircraft comprising a landing assistance device according to claim 7.

* * * * *